US012211419B1

(12) United States Patent
He

(10) Patent No.: US 12,211,419 B1
(45) Date of Patent: Jan. 28, 2025

(54) DRIVING METHOD FOR DISPLAY PANEL, DRIVING CHIP, AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jhenwei He, Shenzhen (CN)

(73) Assignee: SHENZHEN CHINA STAR OPTOELECTRONICS SEMICONDUCTOR DISPLAY TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/401,516

(22) Filed: Dec. 31, 2023

(30) Foreign Application Priority Data

Dec. 8, 2023 (CN) ......................... 202311682788.4

(51) Int. Cl.
*G09G 3/20* (2006.01)

(52) U.S. Cl.
CPC ......... *G09G 3/2074* (2013.01); *G09G 3/2011* (2013.01); *G09G 2300/0452* (2013.01);
(Continued)

(58) Field of Classification Search
None
See application file for complete search history.

(56) References Cited

U.S. PATENT DOCUMENTS 8,487,854 B2 * 7/2013 Liao ..................... G09G 3/3648 345/93
9,613,577 B2 * 4/2017 Hong ................... G09G 3/3677
(Continued)

FOREIGN PATENT DOCUMENTS

CN 112530344 A 3/2021
WO 2022257193 A1 12/2022

OTHER PUBLICATIONS

German Office Action issued in corresponding German Patent Application No. 102023213341.5 dated Jun. 21, 2024, pp. 1-7, 14pp.

*Primary Examiner* — Matthew Yeung
(74) *Attorney, Agent, or Firm* — The Roy Gross Law Firm, LLC; Roy Gross

(57) ABSTRACT

A driving method for a display panel, a driving chip, and a display device are provided. By driving sub-pixels for display across multiple frames, and ensuring each sub-pixel in every frame possesses either a high or low grayscale data compensation state, and either a positive or negative polarity, it's ensured that within the same frame, among the sub-pixels with the same display color and in the high grayscale data compensation state in two neighboring sub-pixel columns, at least one sub-pixel has a different polarity from the others. Under the Tri-Gate driving architecture, pixel polarities flip at intervals of an odd number of sub-pixels in each pixel column. This reduces polarity differences between the sub-pixels with the same display color and in the high grayscale data compensation state in four adjacent sub-pixel columns. This improves the perception of brightness changes when head movement occurs and reduces the risk of nodding lines.

18 Claims, 7 Drawing Sheets

(52) U.S. Cl.
CPC ............... *G09G 2300/0469* (2013.01); *G09G 2320/0261* (2013.01); *G09G 2354/00* (2013.01)

(56) References Cited

U.S. PATENT DOCUMENTS

| | | | | |
|---|---|---|---|---|
| 9,704,428 | B2 * | 7/2017 | Mori .................... | G09G 3/2074 |
| 2018/0267377 | A1 * | 9/2018 | Ying .................... | G09G 3/3614 |
| 2019/0019465 | A1 * | 1/2019 | Nojiri .................. | H04N 13/356 |
| 2019/0189072 | A1 * | 6/2019 | Huang ................. | G09G 3/3614 |
| 2019/0206341 | A1 * | 7/2019 | Liao ...................... | G02F 1/1343 |
| 2021/0049971 | A1 * | 2/2021 | Xiao ..................... | G06F 3/0412 |

* cited by examiner

DRIVING METHOD FOR DISPLAY PANEL, DRIVING CHIP, AND DISPLAY DEVICE

CROSS REFERENCE TO RELATED APPLICATIONS

This application claims the benefit of priority of Chinese Patent Application No. 202311682788.4 filed Dec. 8, 2023, the contents of which are all incorporated herein by reference in their entirety.

FIELD OF DISCLOSURE

The present disclosure relates to a field of display technology, specifically to a driving method for a display panel, a driving chip, and a display device.

DESCRIPTION OF RELATED ART

The existing triple gate (Tri-Gate) driving architecture combined with 4 domain vertical alignment (4 Domain VA) technology can enhance penetration rate and save on backlight costs. Under the Tri-Gate+4 Domain VA combination, applying an angle of view improvement algorithm can fulfill the demand for improved image quality. However, when the Tri-Gate driving architecture is paired with the angle of view improvement algorithm, due to the conflict between the angle compensation method and the Tri-Gate driving architecture, it results in serious nodding lines on the display screen.

SUMMARY OF INVENTION

The embodiments of the present disclosure provide a driving method for a display panel, a driving chip, and a display device, aimed at improving the technical issue of severe nodding lines.

The present disclosure provides a driving method for driving a display panel that includes a plurality of first data lines, a plurality of second data lines, and a plurality of sub-pixels. The first data lines and the second data lines are alternately arranged in a row direction; the sub-pixels are arranged along the row direction and a column direction that intersect with each other to form a plurality of sub-pixel rows in the column direction and a plurality of sub-pixel columns in the row direction, and the sub-pixel rows include a plurality of first sub-pixel rows, a plurality of second sub-pixel rows, and a plurality of third sub-pixel rows arranged alternately. The sub-pixels in the same sub-pixel row exhibit a same display color, and the display colors of the sub-pixels differ across the first, second, and third sub-pixel rows. The driving method includes: driving the sub-pixels to display across multiple frames, wherein in each frame, every sub-pixel possesses either a high grayscale data compensation state or a low grayscale data compensation state and exhibits either a positive polarity or a negative polarity. The display panel includes a plurality of first sub-pixel groups electrically connected to the first data lines and a plurality of second sub-pixel groups electrically connected to the second data lines, each of the sub-pixel columns includes multiple ones of the first sub-pixel groups and multiple ones of the second sub-pixel groups alternately arranged, each of the first sub-pixel groups is electrically connected to a corresponding one of the first data lines, and each of the second sub-pixel groups is connected to a corresponding one of the second data lines and includes (2n+1) sub-pixels, where n is a positive integer. In the same frame, among the sub-pixels in any pair of adjacent sub-pixel columns that exhibit the same display color and are in the high grayscale data compensation state, at least one sub-pixel differs in polarity from the other sub-pixels.

In some embodiments, within the same frame, the sub-pixels in the first sub-pixel groups exhibit the same polarity, the sub-pixels in the second sub-pixel groups exhibit the same polarity, and the polarity of the sub-pixels in the first sub-pixel groups is opposite to the polarity of the sub-pixels in the second sub-pixel groups.

In some embodiments, within the same sub-pixel column, among the sub-pixels that exhibit the same display color and are in the high grayscale data compensation state, the polarities of two adjacent sub-pixels are opposite.

In some embodiments, within the same frame, when the sub-pixels with the same display color and in the high grayscale data compensation state display a same grayscale level, absolute values of average effective voltages of the first data line and the second data line that are adjacent to each other are the same.

According to some embodiments, in the same sub-pixel row, the grayscale data compensation states for each pair of neighboring sub-pixels repeat in an alternating sequence of being opposite and same.

According to some embodiments, in the same sub-pixel column, the grayscale data compensation states for each pair of neighboring sub-pixels repeat in an alternating sequence of being opposite and same.

In some embodiments, both the first sub-pixel group and the second sub-pixel group include a first sub-pixel, a second sub-pixel, and a third sub-pixel arranged along the column direction. In the same sub-pixel column, the grayscale data compensation states of the first sub-pixels in the first sub-pixel groups repeat in an alternating sequence of being opposite and same, the grayscale data compensation states of the second sub-pixels in the first sub-pixel groups repeat in an alternating sequence of being opposite and same, the grayscale data compensation states of the third sub-pixels in the first sub-pixel groups repeat in an alternating sequence of being same and opposite, the grayscale data compensation state of the first sub-pixel in each second sub-pixel group is opposite to the grayscale data compensation state of the third sub-pixel in the immediately preceding adjacent first sub-pixel group, the grayscale data compensation states of the second sub-pixels in the second sub-pixel groups repeat in an alternating sequence of being opposite and same, and the grayscale data compensation states of the third sub-pixels in the second sub-pixel groups repeat in an alternating sequence of being opposite and same. The grayscale data compensation state of the third sub-pixel in each second sub-pixel group is the same as the grayscale data compensation state of the first sub-pixel in the immediately preceding adjacent first sub-pixel group.

According to some embodiments, within the same sub-pixel column, the grayscale data compensation state of the sub-pixel in the first sub-pixel group that is adjacent to the second sub-pixel, is opposite to the grayscale data compensation state of the sub-pixel in the second sub-pixel group that is adjacent to the first sub-pixel; the grayscale data compensation states of the sub-pixels with the same display color in the first sub-pixel groups repeat in an opposite sequence, and the grayscale data compensation states of the sub-pixels with the same display color in the second sub-pixel groups repeat in an opposite sequence; in each first sub-pixel group, the grayscale data compensation states of two adjacent sub-pixels are opposite, and in each second sub-pixel group, the grayscale data compensation states of two adjacent sub-pixels are opposite.

The present disclosure further provides a driving chip. The driving chip includes a timing control chip and a source driving chip connected to the timing control chip, wherein the driving chip is configured to execute program instructions to implement the above-mentioned driving method for the display panel.

The present disclosure further provides a display device, including: a display panel; and a driving chip electrically connected to the display panel. The driving chip is configured to execute program instructions to implement the above-mentioned driving method for the display panel.

In the driving method for the display panel, the driving chip, and the display device provided by the embodiments of the present disclosure, multiple sub-pixels are driven for display across multiple frames. Each sub-pixel in each frame has either a high grayscale data compensation state or a low grayscale data compensation state, and either a positive or a negative polarity. This ensures that, within the same frame, among multiple sub-pixels in any pair of adjacent sub-pixel columns that have the same display color and are in the high grayscale data compensation state, at least one sub-pixel has a different polarity from the other sub-pixels. Thus, under the Tri-Gate driving architecture, the design of flipping pixel polarities at intervals of an odd number of sub-pixels in each pixel column is implemented. This design reduces the polarity differences between the sub-pixels with the same display color and the high grayscale data compensation state in four adjacent sub-pixel columns. It ameliorates the phenomenon where brightness changes caused by significant polarity differences in regions of head movement are perceived by the human eye, resulting in the appearance of nodding lines.

BRIEF DESCRIPTION OF DRAWINGS

In order to more clearly illustrate the technical solutions in the embodiments of the present disclosure, the drawings needed to be used in the description of the embodiments are briefly introduced below. Obviously, the drawings in the following description are only some embodiments of the present disclosure. For those skilled in the art, other drawings can also be obtained based on these drawings without exerting creative efforts.

DETAILED DESCRIPTION OF EMBODIMENTS

Figure 1:
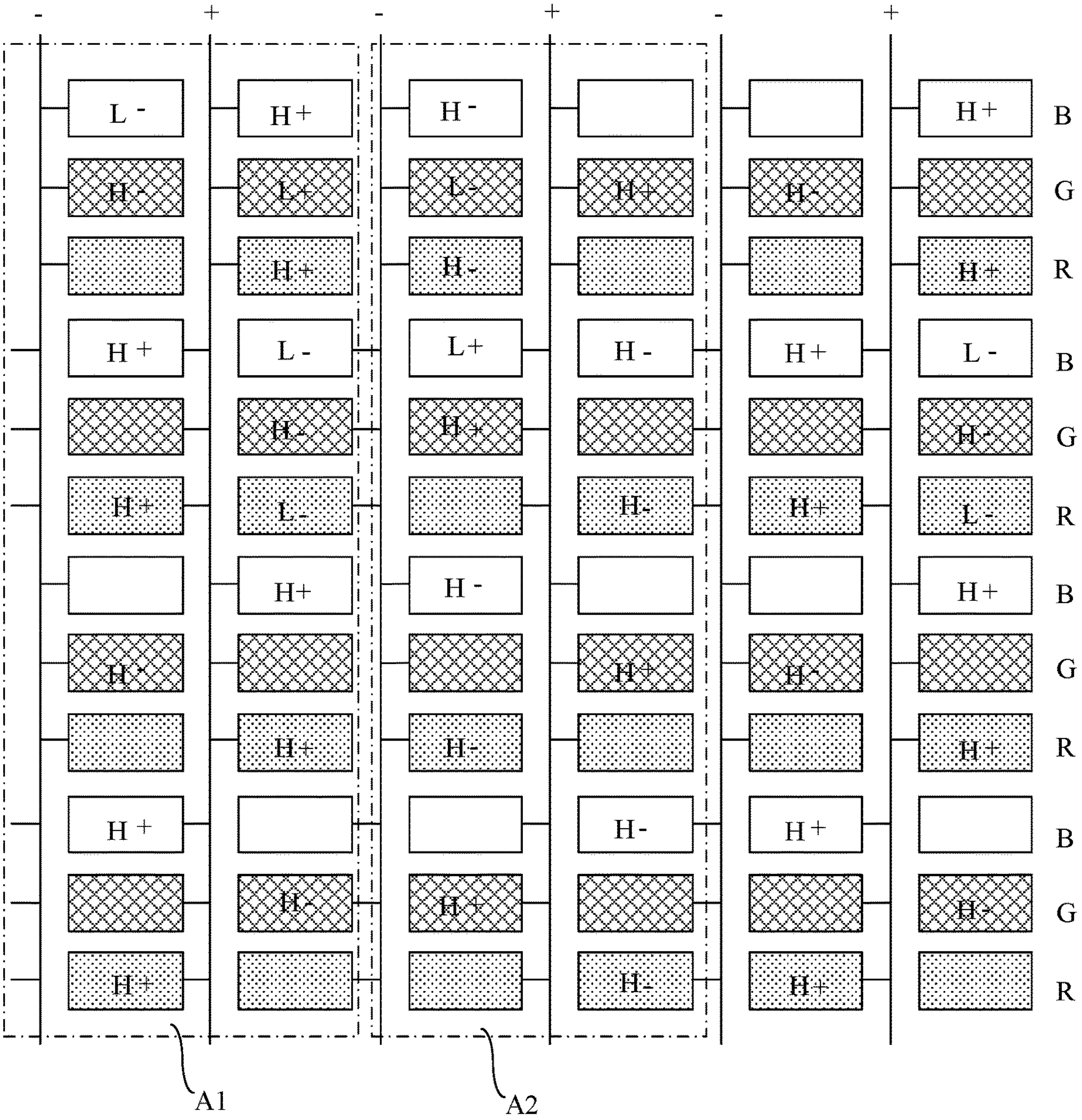
FIG. 1 is a schematic plan view of a display panel according to one embodiment of the present disclosure.

The following description, in conjunction with the accompanying drawings of embodiments of the present disclosure, provides a clear and complete description of the technical solutions in the embodiments of the disclosure. It is apparent that the described embodiments are only a part of the embodiments of the disclosure, and not all embodiments. Based on the embodiments of this disclosure, all other embodiments obtained by those skilled in the art without creative efforts fall within the scope of protection of this disclosure. Furthermore, it should be understood that the specific embodiments described here are only used to explain and illustrate the disclosure and are not intended to limit the disclosure. In this disclosure, unless otherwise specified, directional terms such as "up" and "down" generally refer to the up and down in the actual use or working state of the device, specifically as the direction in the drawings; while "inner" and "outer" refer to the contour of the device.

As shown in FIG. 1, compensation states of sub-pixels include a high grayscale data compensation state H and a low grayscale data compensation state L, and the polarities of the sub-pixels include a positive polarity + and a negative polarity −. Taking green, a color to which the human eye is relatively sensitive, as an example, the issues of nodding lines (motion lines) and bright-dark lines are explained. In two adjacent sub-pixel columns of a first area A1, the green sub-pixels G are in a high grayscale data compensation state H and have a negative polarity −. In two adjacent sub-pixel columns of a second area A2, the green sub-pixels G are in a high grayscale data compensation state H and have a positive polarity +. Therefore, the polarity of the green sub-pixels G in the first area A1 is completely opposite to the polarity of the green sub-pixels G in the second area A2, resulting in a significant difference in polarity between the two adjacent sub-pixel columns of the first area A1 and the second area A2.

Moreover, the green sub-pixels G in the first area A1 with the high grayscale data compensation state H and the green sub-pixels G in the second area A2 with the high grayscale data compensation state H undergo polarity switching in different frames. When the head is stationary, the brightness in the first area A1 and the second area A2 is averaged over time and is not easily perceived by the human eye as being uneven. However, once the head moves, this time-averaging effect is disrupted. As a result, the human eye can easily perceive the uneven brightness, leading to the appearance of severe nodding lines.

Figure 2:
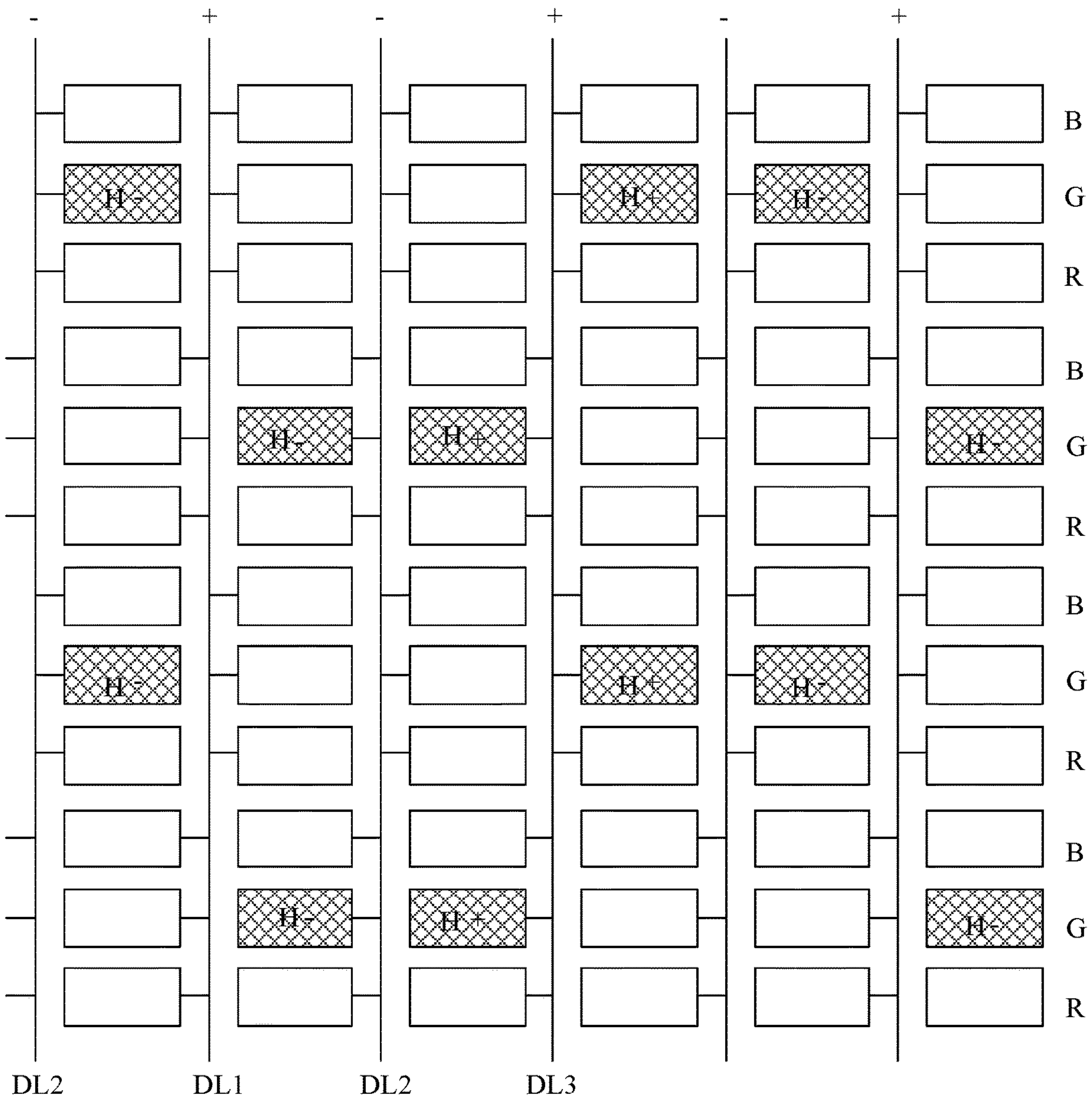
FIG. 2 is a schematic plan view of the display panel according to one embodiment of the present disclosure.

Furthermore, within each frame duration, average effective voltages transmitted by the first data line DL1, the second data line DL2, and the third data line DL3 are all different. For instance, in a frame as shown in FIG. 2, the data voltages transmitted to multiple sub-pixels by the first data line DL1 are: 0-0-0-0-0-0-0-0-0-0-0-0 . . . ; data voltages transmitted to multiple sub-pixels by the second data line DL2 are: 0-(H−)-0-0-0-0-0-(H−)-0-0-0-0 . . . ; data voltages transmitted to multiple sub-pixels by the third data line DL3 are: 0-(H+)-0-0-(H+)-0-0-(H+)-0-0-(H+)-0- . . . . Consequently, within a frame, the average effective voltage Vrms_A transmitted by the first data line DL1, the average effective voltage Vrms_B transmitted by the second data line DL2, and the average effective voltage Vrms_C transmitted by the third data line DL3 are all different, leading to a distribution of vertical dark lines in the vertical direction (such as the brightness difference between GH− in the first area A1 and GH+ in the second area A2), resulting in severe vertical crosstalk issues.

Due to the fact that a light and dark pixel cycle of the angle of view improvement algorithm is consistent with an odd number flip cycle period in the Tri-Gate driving architecture, the polarity pattern of light-dark sub-pixels of different colors in the same column is the same, but the polarity pattern of the sub-pixels in different areas is different. This leads to issues with nodding lines and vertical crosstalk. (For example, considering the green sub-pixels G as shown in FIG. 1, by observing the arrangement pattern of the green sub-pixels in FIG. 1, it is known that the polarities of the green sub-pixels G with the high grayscale data compensation state H in columns 1, 2, 5, 6, . . . are all "−"; while the polarities of the green sub-pixels G with the high grayscale data compensation state H in columns 3, 4, 7, 8, . . . are all "+". Such an asymmetric polarity arrangement becomes the cause of nodding lines and vertical crosstalk.)

Figure 3:
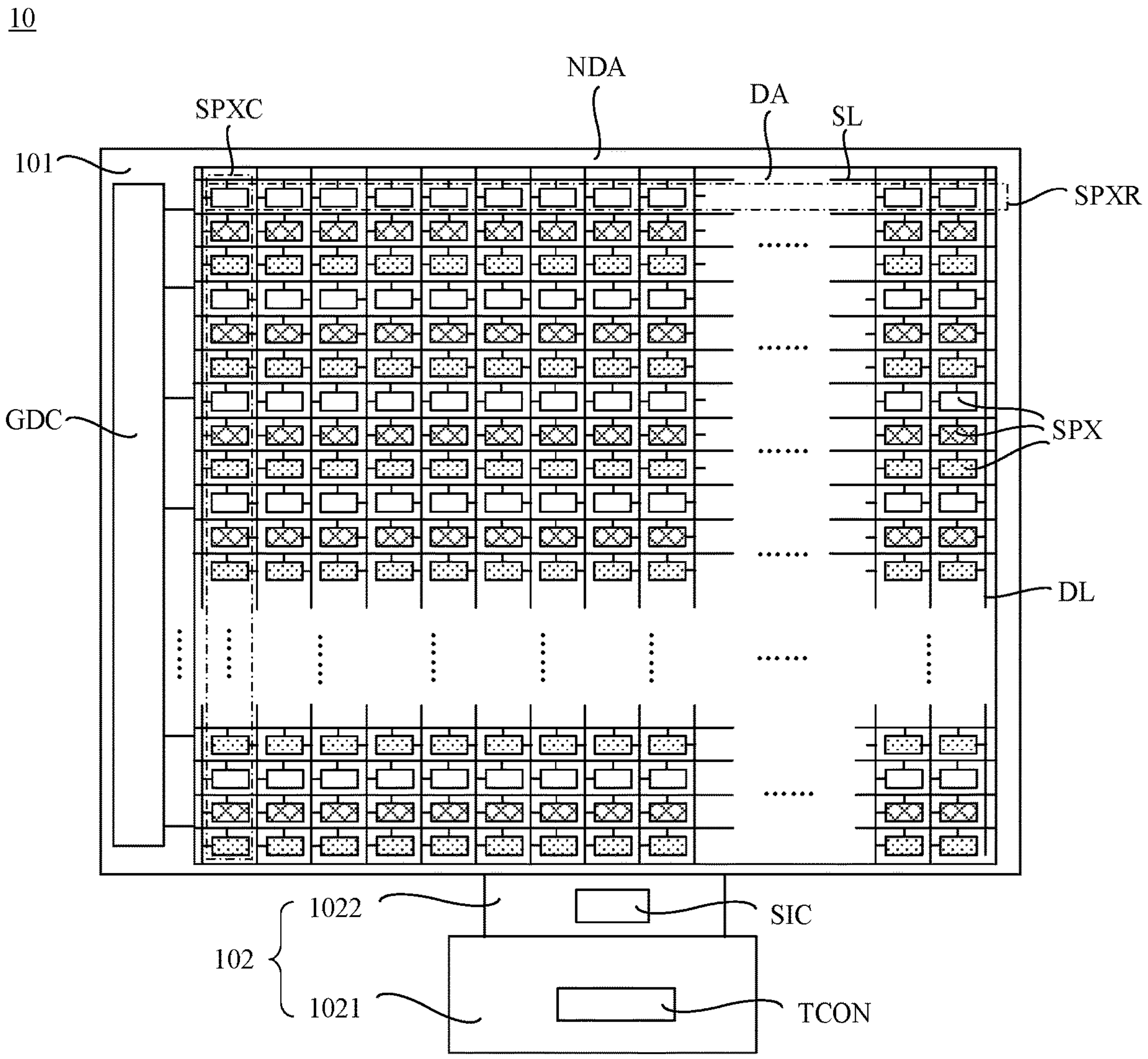
FIG. 3 is a schematic plan view of the display device according to one embodiment of the present disclosure.

FIG. 3 is a schematic plan view of the display device according to one embodiment of the present disclosure. The embodiment provides a display device 10. The display device 10 includes a display panel 101 and a driving module 102.

Optionally, the display panel 101 includes a liquid crystal display panel.

The display panel 101 includes multiple sub-pixels SPX, multiple data lines DL, multiple scan lines SL, and a gate driving circuit GDC.

The sub-pixels SPX are used to display images, and these sub-pixels SPX are arranged in a display area DA. The sub-pixels SPX are electrically connected to the data lines DL and the scan lines SL. The sub-pixels SPX are arranged along intersecting row and column directions to form multiple sub-pixel rows SPXR arranged in the column direction, and to also form multiple sub-pixel columns SPXC arranged in the row direction.

Figure 4:
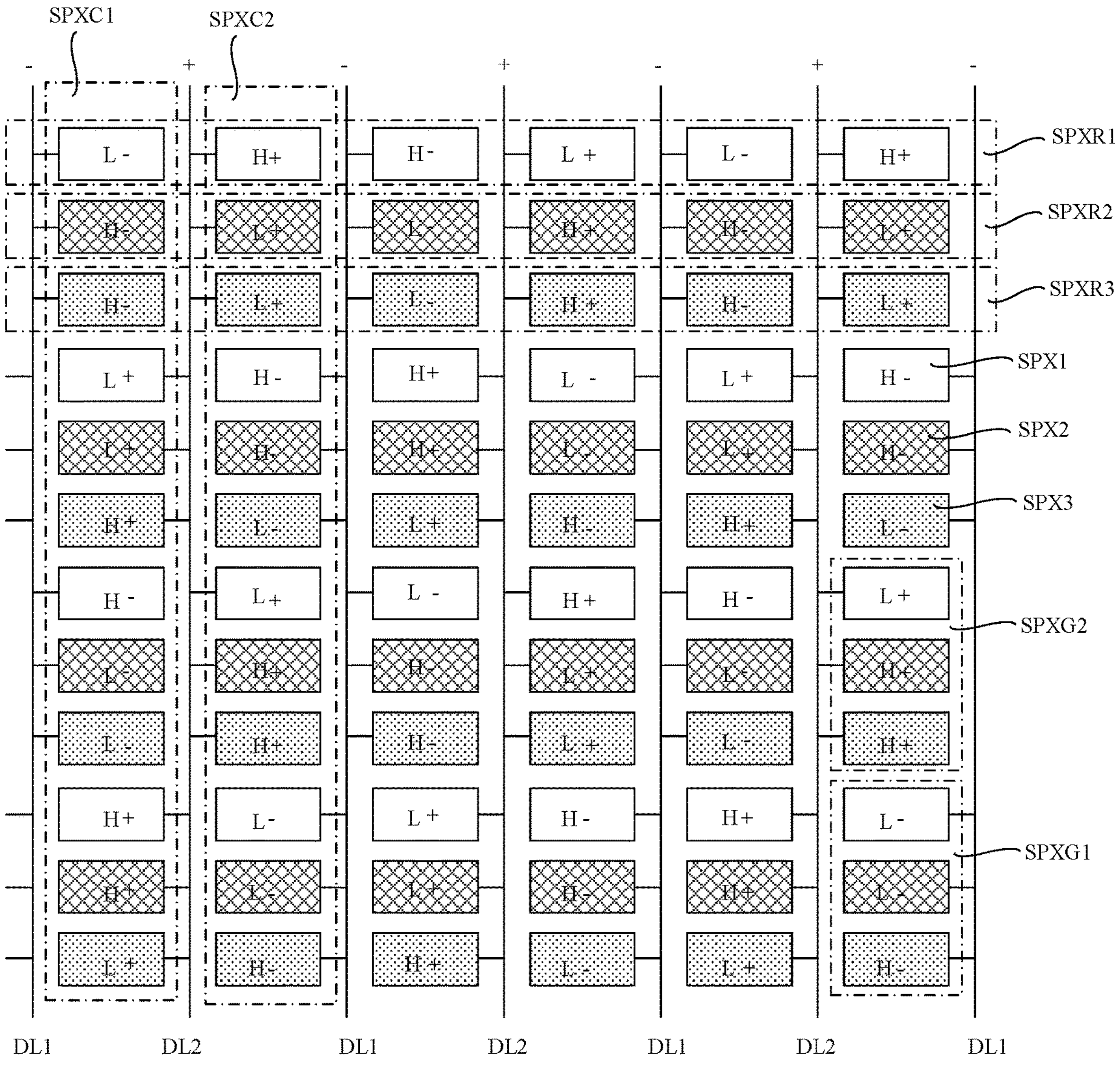
FIG. 4 is a schematic plan view of the display panel according to one embodiment of the present disclosure.

Optionally, as shown in FIGS. 3 to 4, the sub-pixel rows SPXR include alternately arranged multiple first sub-pixel rows SPXR1, multiple second sub-pixel rows SPXR2, and multiple third sub-pixel rows SPXR3. The multiple sub-pixels SPX in the same sub-pixel row SPXR exhibit a same display color. The display color of the sub-pixels SPX in the first sub-pixel row SPXR1, the display color of the sub-pixels SPX in the second sub-pixel row SPXR2, and the display color of the sub-pixels SPX in the third sub-pixel row SPXR3 are all different from each other.

Optionally, the sub-pixels SPX include multiple first sub-pixels SPX1, multiple second sub-pixels SPX2, and multiple third sub-pixels SPX3. Each of the first sub-pixel rows SPXR1 includes multiple first sub-pixels SPX1, each of the second sub-pixel rows SPXR2 includes multiple second sub-pixels SPX2, and each of the third sub-pixel rows SPXR3 includes multiple third sub-pixels SPX3. That is, the sub-pixels SPX form a Tri-Gate driving architecture.

Optionally, the first sub-pixel SPX1 is a blue sub-pixel, the second sub-pixel SPX2 is a green sub-pixel, and the third sub-pixel SPX3 is a red sub-pixel. Furthermore, the types of the first sub-pixel SPX1, the second sub-pixel SPX2, and the third sub-pixel SPX3 are not limited in this regard.

The data lines DL include multiple first data lines DL1 and multiple second data lines DL2, with the multiple first data lines DL1 and the multiple second data lines DL2 being alternately arranged in the row direction. The display panel 101 includes multiple first sub-pixel groups SPXG1 that are electrically connected to the multiple first data lines DL1, and multiple second sub-pixel groups SPXG2 that are electrically connected to the multiple second data lines DL2. Each sub-pixel column SPXC includes alternating multiple first sub-pixel groups SPXG1 and multiple second sub-pixel groups SPXG2, such that between two adjacent first sub-pixel groups SPXG1 connected to the same first data line DL1, there is one second sub-pixel group SPXG2 connected to the second data line DL2. Each first sub-pixel group SPXG1 is electrically connected to the corresponding first data line DL1, and each second sub-pixel group SPXG2 is connected to the corresponding second data line DL2.

Please refer to FIG. 3. The gate driving circuit GDC is located within the non-display area NDA. The gate driving circuit GDC drives multiple rows of the sub-pixels SPX via multiple scan lines SL. By sequentially turning on multiple rows of the sub-pixels SPX, data signals are loaded into the multiple rows of the sub-pixels SPX through the data lines DL. This allows the display panel 101 to display a complete frame within the duration of one frame. The non-display area NDA is located on at least one side of the display area DA. Optionally, the non-display area NDA can at least partially surround the display area DA.

The driving module 102 includes a circuit board 1021 and a chip on film (COF) 1022. Optionally, the circuit board 1021 includes a printed circuit board, and the COF 1022 includes a flexible circuit board. The COF 1022 includes a source driving chip SIC used to transmit data signals to the multiple data lines DL. The circuit board 1021 includes a timing control chip TCON. The timing control chip TCON is electrically connected to both the source driving chip SIC and the gate driving circuit GDC. The timing control chip TCON outputs a control timing sequence to the source driving chip SIC and the gate driving circuit GDC, enabling the source driving chip SIC to output the data signals according to the control timing sequence, and the gate driving circuit GDC to drive multiple rows of the sub-pixels SPX according to the control timing sequence.

Continuing with reference to FIG. 4, the second sub-pixel group SPXG2 includes (2n+1) sub-pixels SPX, where n is greater than or equal to 0, and n is a positive integer. This arrangement allows for a design that implements flipping of pixel polarities at intervals of an odd number of sub-pixels SPX in each pixel column SPXC.

Within the same frame, among the sub-pixels SPX in any pair of adjacent sub-pixel columns SPXC that have the same display color and are in the high grayscale data compensation state H, at least one sub-pixel SPX has a polarity different from the other sub-pixels SPX. This ensures that in any pair of adjacent sub-pixel columns SPXC, the polarities of the sub-pixels SPX with the same display color and in the high grayscale data compensation state H are not uniformly positive (+) or negative (−). This improves the difference in polarity between the sub-pixels SPX with the same display color and in the high grayscale data compensation state H across four adjacent sub-pixel columns SPXC. Consequently, it improves the issue of nodding lines caused by the perception of brightness changes due to significant polarity differences in the regions where head movement occurs and polarities change.

Taking n=1 as an example, the pixel polarity flipping design for the sub-pixels SPX in each sub-pixel column SPXC is explained.

Continuing with reference to FIG. 4, within the same frame, the polarities of the sub-pixels SPX in the first sub-pixel groups SPXG1 are the same, and the polarities of the sub-pixels SPX in the second sub-pixel groups SPXG2 are also the same. However, the polarities of the sub-pixels SPX in the first sub-pixel groups SPXG1 are opposite to the polarities of the sub-pixels SPX in the second sub-pixel groups SPXG2. This ensures that the polarities of the sub-pixels SPX in the first sub-pixel groups SPXG1 connected to the same first data line DL1 are the same, and the polarities of the sub-pixels SPX in the second sub-pixel groups SPXG2 connected to the same second data line DL2 are the same. Further, the polarities of the sub-pixels SPX in the first sub-pixel groups SPXG1 connected to the first data line DL1 are opposite to the polarities of the sub-pixels SPX in the second sub-pixel groups SPXG2 connected to the adjacent second data line DL2.

This allows for a design that achieves pixel polarity flipping at intervals of three sub-pixels SPX in each pixel column SPXC. For example, in each pixel column SPXC, between two adjacent first sub-pixel groups SPXG1, there is a second sub-pixel group SPXG2 that includes three sub-pixels SPX. Within the same frame, the polarities of the sub-pixels SPX in the first sub-pixel groups SPXG1 are either positive or negative, and the polarities of the sub-pixels SPX in the second sub-pixel groups SPXG2 are the opposite. Therefore, in each pixel column SPXC, flipping between positive and negative polarity, or vice versa, can be achieved with an interval of three sub-pixels SPX.

Optionally, within the same sub-pixel column SPXC, where multiple sub-pixels SPX have the same display color and are in the high grayscale data compensation state H, the polarities of two adjacent sub-pixels SPX are opposite. For example, in the first sub-pixel column SPXC1, among the second sub-pixels SPX2 with the high grayscale data compensation state H, the polarities of these second sub-pixels SPX2 alternate between negative (−) and positive (+). This arrangement in the sub-pixel column SPXC ensures that the polarities of the sub-pixels SPX with the same display color and in the high grayscale data compensation state H are not uniformly positive (+) or negative (−). This improves the difference in polarity between the sub-pixels SPX with the same display color and in the high grayscale data compensation state H in two adjacent sub-pixel columns SPXC. Consequently, this can ameliorate the phenomenon of nodding lines observed by the human eye due to significant polarity differences in the regions when head movement occurs.

Optionally, within a single frame in the sub-pixel column SPXC, positions of the first sub-pixels SPX1 with negative polarity − are at SPX1H−=12 (y1-1)+7, and positions of the first sub-pixels SPX1 with positive polarity + are at SPX1H+=12 (y1-1)+10; positions of the second sub-pixels SPX2 with negative polarity − are at SPX2H−=12 (y1-1)+2, and positions of the second sub-pixels SPX2 with positive polarity + are at SPX2H+=12 (y1-1)+11; positions of the third sub-pixels SPX3 with negative polarity − are at SPX3H−=12 (y1-1)+3, and positions of the third sub-pixels SPX3 with positive polarity + are at SPX3H+=12 (y1-1)+6. Here, y1 is greater than or equal to 1. That is, within a single frame in the sub-pixel column SPXC, the sub-pixel rows SPXR corresponding to the first sub-pixels SPX1 with negative polarity − are: 7, 19, 31, . . . , and the sub-pixel rows SPX corresponding to the first sub-pixels SPX1 with positive polarity + are: 10, 22, 34, . . . ; the sub-pixel rows SPXR corresponding to the second sub-pixels SPX2 with negative polarity − are: 2, 14, 26, . . . , and the sub-pixel rows SPXR corresponding to the second sub-pixels SPX2 with positive polarity + are: 11, 23, 35, . . . ; the sub-pixel rows SPXR corresponding to the third sub-pixels SPX3 with negative polarity − are: 3, 15, 27, . . . , and the sub-pixel rows SPXR corresponding to the third sub-pixels SPX3 with positive polarity + are: 6, 18, 30, . . . . Therefore, in the design of flipping pixel polarities at intervals of three sub-pixels SPX in the sub-pixel column SPXC, if the sub-pixel row SPXR divided by 6 has a remainder of 1, then the sub-pixel row SPXR corresponds to the position where the first sub-pixel SPX1 has the negative polarity −. If the sub-pixel row SPXR divided by 6 has a remainder of 4, the sub-pixel row SPXR corresponds to the position where the first sub-pixel SPX1 has the positive polarity +. If the sub-pixel row SPXR divided by 6 has a remainder of 2, the sub-pixel row SPXR corresponds to the position where the second sub-pixel SPX2 has the negative polarity −. If the sub-pixel row SPXR divided by 6 has a remainder of 5, the sub-pixel row SPXR corresponds to the position where the second sub-pixel SPX2 has the positive polarity +. If the sub-pixel row SPXR divided by 6 has a remainder of 3, the sub-pixel row SPXR corresponds to the position where the third sub-pixel SPX3 has the negative polarity −. If the sub-pixel row SPXR divided by 6 has a remainder of 0, the sub-pixel row SPXR corresponds to the position where the third sub-pixel SPX3 has the positive polarity +. This ensures that the distribution of the sub-pixels SPX in the high grayscale data compensation state H in the sub-pixel column SPXC is evenly staggered, thereby reducing the chance of nodding lines issues. It is understandable that in the adjacent frame, the polarities of the sub-pixels SPX are swapped between positive and negative.

Figure 5:
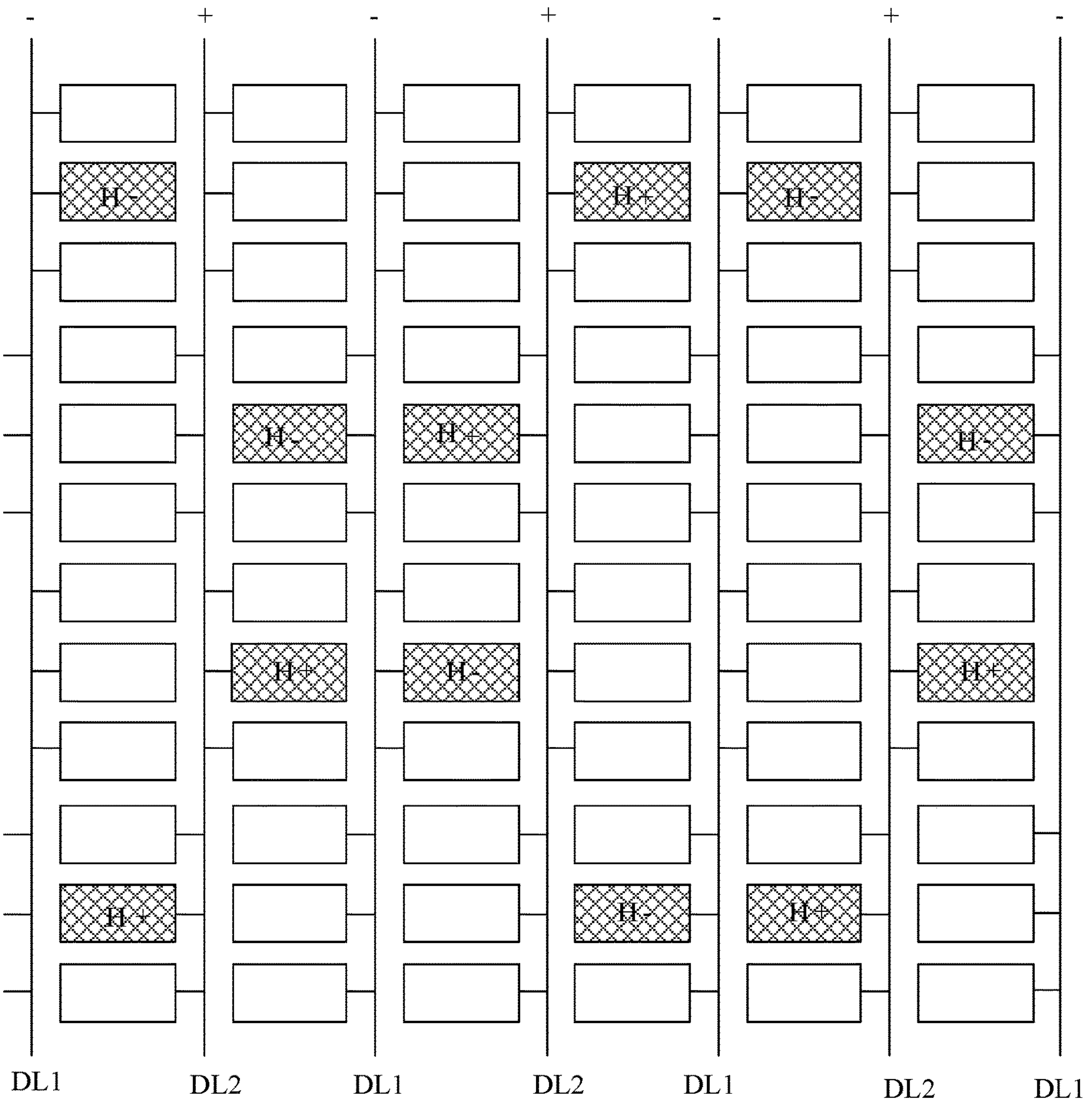
FIG. 5 is a schematic plan view of the display panel according to one embodiment of the present disclosure.

As shown in FIG. 5, within the same frame, when the sub-pixels SPX with the same display color and in the high grayscale data compensation state H display the same grayscale level, the absolute values of the average effective voltages of adjacent first data line DL1 and second data line DL2 are the same. For example, when lighting up the second sub-pixels SPX2 with the high grayscale data compensation state H in the same frame, the voltage of the first data line DL1 can be represented as: 0-0-0-0-(H−)-0-0-(H−)-0-0-0-0 . . . , and the voltage of the second data line DL2 can be represented as: 0-(H+)-0-0-0-0-0-(H+)-0-0-0-0 . . . . Therefore, the average effective voltages of the first data line DL1 and the second data line are identical in magnitude but opposite in polarity during the same frame. This can effectively reduce the risk of vertical crosstalk phenomena.

Optionally, continuing with reference to FIG. 4, within the same sub-pixel row SPXR, the grayscale data compensation states of two adjacent sub-pixels SPX repeat in an alternating sequence of opposite and same. For example, in the first six sub-pixels SPX of the first sub-pixel row SPXR1, the grayscale data compensation states of the six sub-pixels SPX are in the order of low grayscale data compensation state L, high grayscale data compensation state H, high grayscale data compensation state H, low grayscale data compensation state L, low grayscale data compensation state L, high grayscale data compensation state H.

Figure 6:
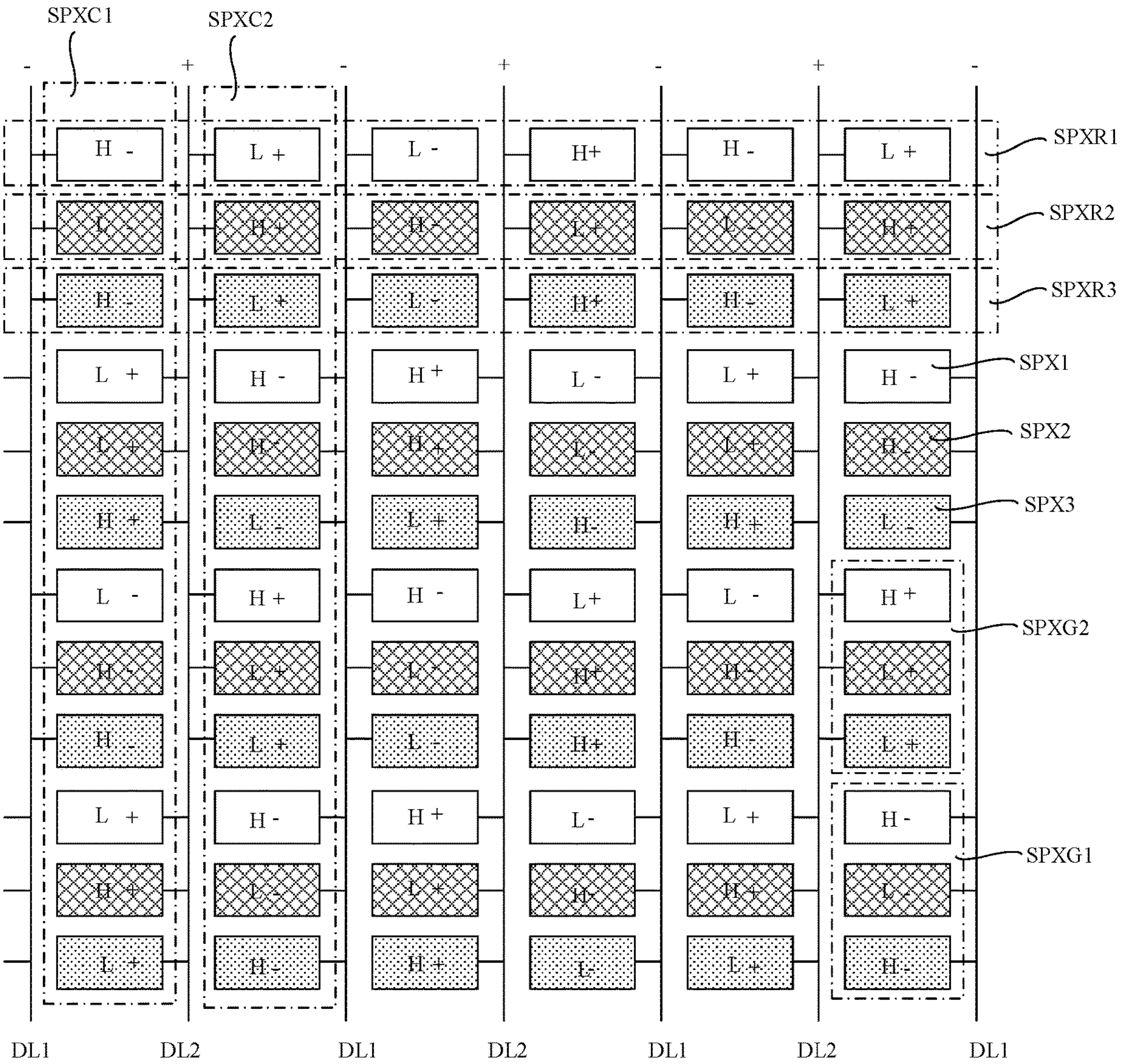
FIG. 6 is a schematic plan view of the display panel according to one embodiment of the present disclosure.
Figure 7:
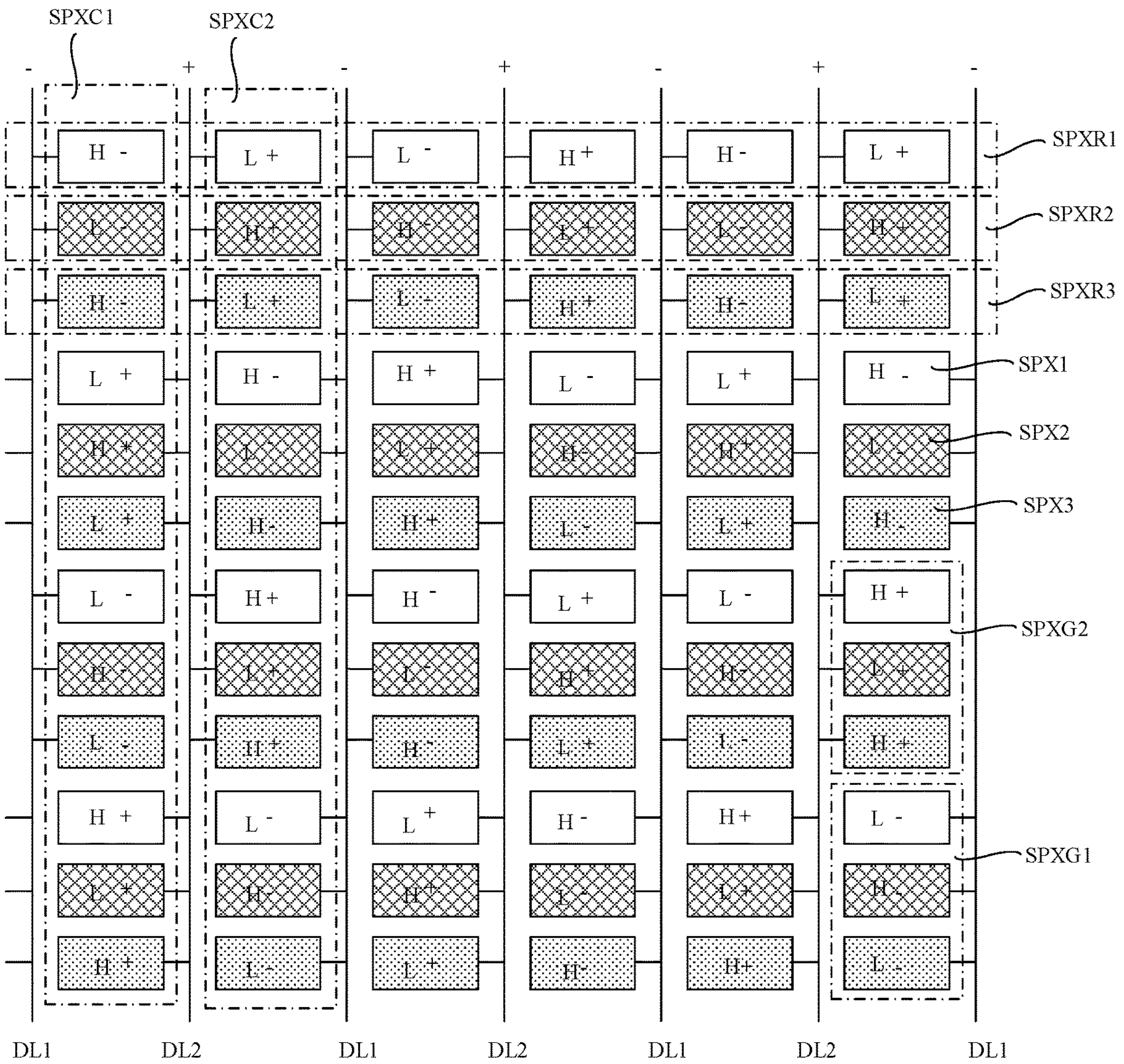
FIG. 7 is a schematic plan view of the display panel according to one embodiment of the present disclosure.

Alternatively, continuing with reference to FIGS. 6 and 7, in the first six sub-pixels SPX of the first sub-pixel row SPXR, the grayscale data compensation states of the six sub-pixels SPX are in the order of high grayscale data compensation state H, low grayscale data compensation state L, low grayscale data compensation state L, high grayscale data compensation state H, high grayscale data compensation state H, low grayscale data compensation state L.

Continuing with reference to FIG. 4, within the same sub-pixel column SPXC, the grayscale data compensation states of two adjacent sub-pixels SPX repeat in an alternating sequence of opposite and same. For example, in the first sub-pixel column SPXC1, the grayscale data compensation states of multiple sub-pixels SPX are in the order of low grayscale data compensation state L, high grayscale data compensation state H, high grayscale data compensation state H, low grayscale data compensation state L.

Referring to FIG. 6, this embodiment is similar to the first embodiment, with the difference being: within the same sub-pixel column SPXC, the grayscale data compensation states of the sub-pixels SPX follow a repeating sequence of high grayscale data compensation state H, low grayscale data compensation state L, high grayscale data compensation state H, low grayscale data compensation state L, low grayscale data compensation state L, high grayscale data compensation state H, low grayscale data compensation state L, and high grayscale data compensation state H. This arrangement ensures that the distribution of the sub-pixels SPX in the high grayscale data compensation state H within the sub-pixel column SPXC is evenly staggered, thereby reducing the risk of nodding lines issues.

Specifically, this is explained using an example where both the first sub-pixel group SPXG1 and the second sub-pixel group SPXG2 include the first sub-pixel SPX1, the second sub-pixel SPX2, and the third sub-pixel SPX3 arranged in the column direction.

In the same sub-pixel column, the grayscale data compensation states of the first sub-pixels SPX1 in the first sub-pixel groups SPXG1 repeat in an alternating sequence of opposite and same. Similarly, the grayscale data compensation states of the second sub-pixels SPX2 in the first sub-pixel groups SPXG1 also repeat in an alternating opposite and same sequence. In the same sub-pixel column, the grayscale data compensation states of the third sub-pixels SPX3 in the first sub-pixel groups SPXG1 repeat in an alternating sequence of same and opposite. The grayscale data compensation state of the first sub-pixel SPX1 in the second sub-pixel group SPXG2 is opposite to the grayscale data compensation state of the third sub-pixel SPX3 in the immediately preceding adjacent first sub-pixel group SPXG1. The grayscale data compensation states of the second sub-pixels SPX2 in the second sub-pixel groups SPXG2 repeat in an alternating sequence of same and opposite, and the grayscale data compensation states of the third sub-pixels SPX3 in the second sub-pixel groups SPXG2 repeat in an alternating sequence of opposite and same. Here, the grayscale data compensation state of the third sub-pixel SPX3 in each second sub-pixel group SPXG2 is the same as the grayscale data compensation state of the first sub-pixel SPX1 in the immediately preceding adjacent first sub-pixel group SPXG1.

For example, in the first sub-pixel column SPXC1, the grayscale data compensation states of the first sub-pixels SPX1 in the first sub-pixel groups SPXG1 are in the order of high grayscale data compensation state H, low grayscale data compensation state L, low grayscale data compensation state L, high grayscale data compensation state H, high grayscale data compensation state H, low grayscale data compensation state L, low grayscale data compensation state L, high grayscale data compensation state H, and so on. In the first sub-pixel column SPXC1, the grayscale data compensation states of the second sub-pixels SPX2 in the first sub-pixel groups SPXG1 are in the order of low grayscale data compensation state L, high grayscale data compensation state H, high grayscale data compensation state H, low grayscale data compensation state L, low grayscale data compensation state L, high grayscale data compensation state H, high grayscale data compensation state H, low grayscale data compensation state L, and so on. In the first sub-pixel column SPXC1, the grayscale data compensation states of the third sub-pixels SPX3 in the first sub-pixel groups SPXG1 are in the order of high grayscale data compensation state H, high grayscale data compensation state H, low grayscale data compensation state L, low grayscale data compensation state L, high grayscale data compensation state H, high grayscale data compensation state H, low grayscale data compensation state L, low grayscale data compensation state L, and so on. In the first sub-pixel column SPXC1, the grayscale data compensation states of the first sub-pixels SPX1 in the second sub-pixel groups SPXG2 are in the order of low grayscale data compensation state L, low grayscale data compensation state L, high grayscale data compensation state H, high grayscale data compensation state H, low grayscale data compensation state L, low grayscale data compensation state L, high grayscale data compensation state H, high grayscale data compensation state H, and so on. In the first sub-pixel column SPXC1, the grayscale data compensation states of the second sub-pixels SPX2 in the second sub-pixel groups SPXG2 are in the order of low grayscale data compensation state L, high grayscale data compensation state H, high grayscale data compensation state H, low grayscale data compensation state L, low grayscale data compensation state L, high grayscale data compensation state H, high grayscale data compensation state H, low grayscale data compensation state L, and so on. In the first sub-pixel column SPXC1, the grayscale data compensation states of the third sub-pixels SPX3 in the second sub-pixel groups SPXG2 are in the order of high grayscale data compensation state H, low grayscale data compensation state L, low grayscale data compensation state L, high grayscale data compensation state H, high grayscale data compensation state H, low grayscale data compensation state L, low grayscale data compensation state L, high grayscale data compensation state H, and so on.

Similarly, within the same sub-pixel column SPXC, the grayscale data compensation states of the sub-pixels SPX repeat in a sequence of low grayscale data compensation state L, high grayscale data compensation state H, low grayscale data compensation state L, high grayscale data compensation state H, high grayscale data compensation state H, low grayscale data compensation state L, high grayscale data compensation state H, low grayscale data compensation state L. This pattern ensures that the distribution of the sub-pixels SPX in the high grayscale data compensation state H within the sub-pixel column SPXC is evenly staggered, thereby reducing the risk of nodding lines issues.

For example, in the second sub-pixel column SPXC2, the grayscale data compensation states of the first sub-pixels SPX1 in the first sub-pixel groups SPXG1 are in the order of low grayscale data compensation state L, high grayscale data compensation state H, high grayscale data compensation state H, low grayscale data compensation state L, low grayscale data compensation state L, high grayscale data compensation state H, high grayscale data compensation state H, low grayscale data compensation state L, and so on. In the second sub-pixel column SPXC2, the grayscale data compensation states of the second sub-pixels SPX2 in the first sub-pixel groups SPXG1 are in the order of high grayscale data compensation state H, low grayscale data compensation state L, low grayscale data compensation state L, high grayscale data compensation state H, high grayscale data compensation state H, low grayscale data compensation state L, low grayscale data compensation state L, high grayscale data compensation state H, and so on. In the second sub-pixel column SPXC2, the grayscale data compensation states of the third sub-pixels SPX3 in the first sub-pixel groups SPXG1 are in the order of low grayscale data compensation state L, low grayscale data compensation state L, high grayscale data compensation state H, high grayscale data compensation state H, low grayscale data compensation state L, low grayscale data compensation state L, high grayscale data compensation state H, high grayscale data compensation state H, and so on. In the second sub-pixel column SPXC2, the grayscale data compensation states of the first sub-pixels SPX1 in the second sub-pixel groups SPXG2 are in the order of high grayscale data compensation state H, high grayscale data compensation state H, low grayscale data compensation state L, low grayscale data compensation state L, high grayscale data compensation state H, high grayscale data compensation state H, low grayscale data compensation state L, low grayscale data compensation state L, and so on. In the second sub-pixel column SPXC2, the grayscale data compensation states of the second sub-pixels SPX2 in the second sub-pixel groups SPXG2 are in the order of high grayscale data compensation state H, low grayscale data compensation state L, low grayscale data compensation state L, high grayscale data compensation state H, high grayscale data compensation state H, low grayscale data compensation state L, low grayscale data compensation state L, high grayscale data compensation state H, and so on. In the second sub-pixel column SPXC2, the grayscale data compensation states of the third sub-pixels SPX3 in the second sub-pixel groups SPXG2 are in the order of low grayscale data compensation state L, high grayscale data compensation state H, high grayscale data compensation state H, low grayscale data compensation state L, low grayscale data compensation state L, high grayscale data compensation state H, high grayscale data compensation state H, low grayscale data compensation state L, and so on.

Referring to FIG. 7, in this embodiment, within the same sub-pixel column SPXC, the grayscale data compensation states of the sub-pixels SPX repeat in a sequence of high grayscale data compensation state H, low grayscale data compensation state L, high grayscale data compensation state H, low grayscale data compensation state L, high grayscale data compensation state H, low grayscale data compensation state L, low grayscale data compensation state L, high grayscale data compensation state H, low grayscale data compensation state L, high grayscale data compensation state H, low grayscale data compensation state L, high grayscale data compensation state H. This pattern ensures that the distribution of the sub-pixels SPX in the high grayscale data compensation state H within the sub-pixel column SPXC is evenly staggered, thereby reducing the risk of nodding lines issues.

Correspondingly, within the same sub-pixel column, the grayscale data compensation state of the sub-pixel SPX adjacent to the second sub-pixel SPX2 in the first sub-pixel group SPXG1 is opposite to the grayscale data compensation state of the sub-pixel SPX adjacent to the first sub-pixel SPX1 in the second sub-pixel group SPXG2. The grayscale data compensation states of the sub-pixels SPX with the same display color in the first sub-pixel groups SPXG1 repeat in the opposite order, and the grayscale data compensation states of the sub-pixels SPX with the same display color in the second sub-pixel groups SPXG2 also repeat in the opposite order. In each first sub-pixel group SPXG1, the grayscale data compensation states of two adjacent sub-pixels SPX are opposite, and in each second sub-pixel group SPXG2, the grayscale data compensation states of two adjacent sub-pixels SPX are opposite.

As an example, still considering the first sub-pixel group SPXG1 and the second sub-pixel group SPXG2 which both include the first sub-pixel SPX1, the second sub-pixel SPX2, and the third sub-pixel SPX3 arranged along the column direction. In the first sub-pixel column SPXC1, the grayscale data compensation states of the first sub-pixels SPX1 in the first sub-pixel groups SPXG1 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on. In the first sub-pixel column SPXC1, the grayscale data compensation states of the second sub-pixels SPX2 in the first sub-pixel groups SPXG1 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on. In the first sub-pixel column SPXC1, the grayscale data compensation states of the third sub-pixels SPX3 in the first sub-pixel groups SPXG1 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on. In the first sub-pixel column SPXC1, the grayscale data compensation states of the first sub-pixels SPX1 in the second sub-pixel groups SPXG2 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on. In the first sub-pixel column SPXC1, the grayscale data compensation states of the second sub-pixels SPX2 in the second sub-pixel groups SPXG2 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on. In the first sub-pixel column SPXC1, the grayscale data compensation states of the third sub-pixels SPX3 in the second sub-pixel groups SPXG2 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on.

Similarly, within the same sub-pixel column SPXC, the grayscale data compensation states of the sub-pixels SPX repeat in a sequence of low grayscale data compensation state L, high grayscale data compensation state H, low grayscale data compensation state L, high grayscale data compensation state H, low grayscale data compensation state L, high grayscale data compensation state H, high grayscale data compensation state H, low grayscale data compensation state L, high grayscale data compensation state H, low grayscale data compensation state L, high grayscale data compensation state H, low grayscale data compensation state L. This pattern ensures that the distribution of the sub-pixels SPX in the high grayscale data compensation state H within the sub-pixel column SPXC is evenly staggered, thereby reducing the chance of nodding lines issues.

For example, in the second sub-pixel column SPXC2, the grayscale data compensation states of the first sub-pixels SPX1 in the first sub-pixel groups SPXG1 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on. In the second sub-pixel column SPXC2, the grayscale data compensation states of the second sub-pixels SPX2 in the first sub-pixel groups SPXG1 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on. In the second sub-pixel column SPXC2, the grayscale data compensation states of the third sub-pixels SPX3 in the first sub-pixel groups SPXG1 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on. In the second sub-pixel column SPXC2, the grayscale data compensation states of the first sub-pixels SPX1 in the second sub-pixel groups SPXG2 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on. In the second sub-pixel column SPXC2, the grayscale data compensation states of the second sub-pixels SPX2 in the second sub-pixel groups SPXG2 are in the order of low grayscale data compensation state L, high grayscale data compensation state H, low grayscale data compensation state L, high grayscale data compensation state H, low grayscale data compensation state L, high grayscale data compensation state H, low grayscale data compensation state L, high grayscale data compensation state H, and so on. In the second sub-pixel column SPXC2, the grayscale data compensation states of the third sub-pixels SPX3 in the second sub-pixel groups SPXG2 are in the order of high grayscale data compensation state H, low grayscale data compensation state L, high grayscale data compensation state H, low grayscale data compensation state L, high grayscale data compensation state H, low grayscale data compensation state L, high grayscale data compensation state H, low grayscale data compensation state L, and so on.

Figure 8:
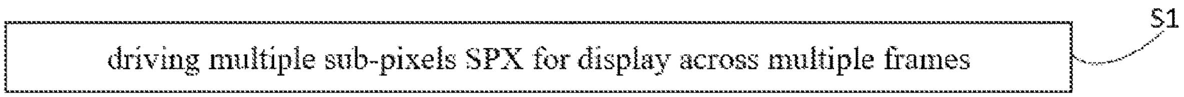
FIG. 8 is a schematic process flow diagram of a driving method for a display panel according to one embodiment of the present disclosure.

Referring to FIG. 8, one embodiment of the present disclosure also provides a driving method for a display panel, applied in the aforementioned display module 1, to drive the display panel 101. The driving method can be implemented by the source driving chip SIC executing corresponding program instructions. The driving method includes:

S1: driving multiple sub-pixels SPX for display across multiple frames.

Wherein, each sub-pixel SPX, within these multiple frames, has a high grayscale data compensation state H and a low grayscale data compensation state L, and possesses either a positive polarity + or a negative polarity −.

Each sub-pixel column SPXC includes multiple sub-pixel groups SPXG. The sub-pixel groups SPXG include a plurality of first sub-pixel groups SPXG1 which are electrically connected to the first data line DL1, and a plurality of second sub-pixel groups SPXG2 which are electrically connected to the second data line DL2. The first sub-pixel groups SPXG1 and the second sub-pixels SPX2 are alternately arranged in the column direction. The second sub-pixel group SPXG2 includes (2n+1) sub-pixels SPX, where n is a positive integer, to achieve a design that flips pixel polarities at intervals of an odd number of the sub-pixels SPX in each pixel column.

Optionally, within the same frame, among the sub-pixels SPX in any pair of adjacent sub-pixel columns SPXC that have the same display color and are in the high grayscale data compensation state H, at least one sub-pixel SPX has a polarity different from the other sub-pixels SPX. This ensures that in any pair of adjacent sub-pixel columns SPXC, the polarities of the sub-pixels SPX with the same display color and in the high grayscale data compensation state H are not uniformly positive (+) or negative (−). This improves the difference in polarity between the sub-pixels SPX with the same display color and in the high grayscale data compensation state H across four adjacent sub-pixel columns SPXC. Consequently, this can alleviate the phenomenon of nodding lines observed by the human eye due to significant polarity differences in the regions when head movement occurs.

Furthermore, every p frames, the polarities of the sub-pixels SPX in the sub-pixel groups PXG are reversed to achieve polarity symmetry over time. Here, p is a positive integer and is greater than or equal to 1.

One embodiment of the present disclosure also provides a driving chip. The driving chip includes a timing control chip and a source driving chip connected to the timing control chip. The driving chip is configured to execute program instructions to implement the aforementioned driving method.

The embodiments of the present disclosure have been described in detail above. Specific examples have been used in this document to explain the principles and implementation methods of the disclosure. The description of the above embodiments is only intended to help understand the methods of the disclosure and its core ideas. At the same time, those skilled in the art can change the specific implementation methods and application scopes according to the ideas of the disclosure. In summary, the contents of this specification should not be construed as limiting the disclosure.

What is claimed is:

1. A driving method for driving a display panel that comprises a plurality of first data lines, a plurality of second data lines, and a plurality of sub-pixels, wherein the first data lines and the second data lines are alternately arranged in a row direction; the sub-pixels are arranged along the row direction and a column direction that intersect with each other to form a plurality of sub-pixel rows in the column direction and a plurality of sub-pixel columns in the row direction, the sub-pixel rows comprise a plurality of first sub-pixel rows, a plurality of second sub-pixel rows, and a plurality of third sub-pixel rows arranged alternately, the sub-pixels in the same sub-pixel row exhibit a same display color, and the display colors of the sub-pixels differ across the first, second, and third sub-pixel rows;

wherein the driving method comprises:

driving the sub-pixels to display across multiple frames, wherein in each frame, every sub-pixel possesses either a high grayscale data compensation state or a low grayscale data compensation state and exhibits either a positive polarity or a negative polarity, wherein the display panel comprises a plurality of first sub-pixel groups electrically connected to the first data lines and a plurality of second sub-pixel groups electrically connected to the second data lines, each of the sub-pixel columns comprises multiple ones of the first sub-pixel groups and multiple ones of the second sub-pixel groups alternately arranged, each of the first sub-pixel groups is electrically connected to a corresponding one of the first data lines, and each of the second sub-pixel groups is connected to a corresponding one of the second data lines and comprises (2n+1) sub-pixels, where n is a positive integer; and in the same frame, among the sub-pixels in any pair of adjacent sub-pixel columns that exhibit the same display color and are in the high grayscale data compensation state, at least one sub-pixel differs in polarity from the other sub-pixels.

2. The driving method for the display panel according to claim 1, wherein within the same frame, the sub-pixels in the first sub-pixel groups exhibit the same polarity, the sub-pixels in the second sub-pixel groups exhibit the same polarity, and the polarity of the sub-pixels in the first sub-pixel groups is opposite to the polarity of the sub-pixels in the second sub-pixel groups.

3. The driving method for the display panel according to claim 1, wherein within the same sub-pixel column, among the sub-pixels that exhibit the same display color and are in the high grayscale data compensation state, the polarities of two adjacent sub-pixels are opposite.

4. The driving method for the display panel according to claim 3, wherein within the same frame, when the sub-pixels with the same display color and in the high grayscale data compensation state display a same grayscale level, absolute values of average effective voltages of the first data line and the second data line that are adjacent to each other are the same.

5. The driving method for the display panel according to claim 1, wherein in the same sub-pixel row, the grayscale data compensation states for each pair of neighboring sub-pixels repeat in an alternating sequence of being opposite and same.

6. The driving method for the display panel according to claim 5, wherein in the same sub-pixel column, the grayscale data compensation states for each pair of neighboring sub-pixels repeat in an alternating sequence of being opposite and same.

7. The driving method for the display panel according to claim 5, wherein both the first sub-pixel group and the second sub-pixel group comprise a first sub-pixel, a second sub-pixel, and a third sub-pixel arranged along the column direction;

in the same sub-pixel column, the grayscale data compensation states of the first sub-pixels in the first sub-pixel groups repeat in an alternating sequence of being opposite and same, the grayscale data compensation states of the second sub-pixels in the first sub-pixel groups repeat in an alternating sequence of being opposite and same, the grayscale data compensation states of the third sub-pixels in the first sub-pixel groups repeat in an alternating sequence of being same and opposite, the grayscale data compensation state of the first sub-pixel in each second sub-pixel group is opposite to the grayscale data compensation state of the third sub-pixel in the immediately preceding adjacent first sub-pixel group, the grayscale data compensation states of the second sub-pixels in the second sub-pixel groups repeat in an alternating sequence of being opposite and same, and the grayscale data compensation states of the third sub-pixels in the second sub-pixel groups repeat in an alternating sequence of being opposite and same, wherein the grayscale data compensation state of the third sub-pixel in each second sub-pixel group is the same as the grayscale data compensation state of the first sub-pixel in the immediately preceding adjacent first sub-pixel group.

8. The driving method for the display panel according to claim 5, wherein within the same sub-pixel column, the grayscale data compensation state of the sub-pixel in the first sub-pixel group that is adjacent to the second sub-pixel, is opposite to the grayscale data compensation state of the sub-pixel in the second sub-pixel group that is adjacent to the first sub-pixel; the grayscale data compensation states of the sub-pixels with the same display color in the first sub-pixel groups repeat in an opposite sequence, and the grayscale data compensation states of the sub-pixels with the same display color in the second sub-pixel groups repeat in an opposite sequence; in each first sub-pixel group, the grayscale data compensation states of two adjacent sub-pixels are opposite, and in each second sub-pixel group, the grayscale data compensation states of two adjacent sub-pixels are opposite.

9. A driving chip, comprising a timing control chip and a source driving chip connected to the timing control chip, wherein the driving chip is configured to execute program instructions to implement the driving method for the display panel as claimed in claim 1.

10. A display device, comprising:

a display panel; and a driving chip electrically connected to the display panel and configured to execute program instructions to implement a driving method for a display panel, wherein the display panel comprises a plurality of first data lines, a plurality of second data lines, and a plurality of sub-pixels, wherein the first data lines and the second data lines are alternately arranged in a row direction; the sub-pixels are arranged along the row direction and a column direction that intersect with each other to form a plurality of sub-pixel rows in the column direction and a plurality of sub-pixel columns in the row direction, the sub-pixel rows comprise a plurality of first sub-pixel rows, a plurality of second sub-pixel rows, and a plurality of third sub-pixel rows arranged alternately, the sub-pixels in the same sub-pixel row exhibit a same display color, and the display colors of the sub-pixels differ across the first, second, and third sub-pixel rows;

wherein the driving method comprises:

driving the sub-pixels to display across multiple frames, wherein in each frame, every sub-pixel possesses either a high grayscale data compensation state or a low grayscale data compensation state and exhibits either a positive polarity or a negative polarity;

wherein the display panel comprises a plurality of first sub-pixel groups electrically connected to the first data lines and a plurality of second sub-pixel groups electrically connected to the second data lines, each of the sub-pixel columns comprises multiple ones of the first sub-pixel groups and multiple ones of the second sub-pixel groups alternately arranged, each of the first sub-pixel groups is electrically connected to a corresponding one of the first data lines, and each of the second sub-pixel groups is connected to a corresponding one of the second data lines and comprises (2n+1) sub-pixels, where n is a positive integer; and in the same frame, among the sub-pixels in any pair of adjacent sub-pixel columns that exhibit the same display color and are in the high grayscale data compensation state, at least one sub-pixel differs in polarity from the other sub-pixels.

11. The display device according to claim 10, wherein within the same frame, the sub-pixels in the first sub-pixel groups exhibit the same polarity, the sub-pixels in the second sub-pixel groups exhibit the same polarity, and the polarity of the sub-pixels in the first sub-pixel groups is opposite to the polarity of the sub-pixels in the second sub-pixel groups.

12. The display device according to claim 10, wherein within the same sub-pixel column, among the sub-pixels that exhibit the same display color and are in the high grayscale data compensation state, the polarities of two adjacent sub-pixels are opposite.

13. The display device according to claim 12, wherein within the same frame, when the sub-pixels with the same display color and in the high grayscale data compensation state display a same grayscale level, absolute values of average effective voltages of the first data line and the second data line that are adjacent to each other are the same.

14. The display device according to claim 10, wherein in the same sub-pixel row, the grayscale data compensation states for each pair of neighboring sub-pixels repeat in an alternating sequence of being opposite and same.

15. The display device according to claim 14, wherein in the same sub-pixel column, the grayscale data compensation states for each pair of neighboring sub-pixels repeat in an alternating sequence of being opposite and same.

16. The display device according to claim 14, wherein both the first sub-pixel group and the second sub-pixel group comprise a first sub-pixel, a second sub-pixel, and a third sub-pixel arranged along the column direction;

in the same sub-pixel column, the grayscale data compensation states of the first sub-pixels in the first sub-pixel groups repeat in an alternating sequence of being opposite and same, the grayscale data compensation states of the second sub-pixels in the first sub-pixel groups repeat in an alternating sequence of being opposite and same, the grayscale data compensation states of the third sub-pixels in the first sub-pixel groups repeat in an alternating sequence of being same and opposite, the grayscale data compensation state of the first sub-pixel in each second sub-pixel group is opposite to the grayscale data compensation state of the third sub-pixel in the immediately preceding adjacent first sub-pixel group, the grayscale data compensation states of the second sub-pixels in the second sub-pixel groups repeat in an alternating sequence of being opposite and same, and the grayscale data compensation states of the third sub-pixels in the second sub-pixel groups repeat in an alternating sequence of being opposite and same, wherein the grayscale data compensation state of the third sub-pixel in each second sub-pixel group is the same as the grayscale data compensation state of the first sub-pixel in the immediately preceding adjacent first sub-pixel group.

17. The display device according to claim 14, wherein within the same sub-pixel column, the grayscale data compensation state of the sub-pixel in the first sub-pixel group that is adjacent to the second sub-pixel, is opposite to the grayscale data compensation state of the sub-pixel in the second sub-pixel group that is adjacent to the first sub-pixel; the grayscale data compensation states of the sub-pixels with the same display color in the first sub-pixel groups repeat in an opposite sequence, and the grayscale data compensation states of the sub-pixels with the same display color in the second sub-pixel groups repeat in an opposite sequence; in each first sub-pixel group, the grayscale data compensation states of two adjacent sub-pixels are opposite, and in each second sub-pixel group, the grayscale data compensation states of two adjacent sub-pixels are opposite.

18. The display device according to claim 10, further comprising a driving module electrically connected to the driving chip, wherein the driving module comprises a circuit board and a chip on film (COF), the COF comprises a source driving chip, the circuit board comprises a timing control chip, the timing control chip is electrically connected to the source driving chip and a gate driving circuit to output a control timing sequence to the source driving chip and the gate driving circuit.

* * * * *